(12) United States Patent
Cho et al.

(10) Patent No.: US 9,126,633 B2
(45) Date of Patent: Sep. 8, 2015

(54) REINFORCEMENT UNIT FOR ENGINE-ROOM ENCAPSULATION

(71) Applicant: Hyundai Motor Company, Seoul (KR)

(72) Inventors: Hyun Cho, Seoul (KR); Joonho Lee, Seoul (KR); Jong Woo Nam, Seoul (KR); Hanshin Chung, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/108,089

(22) Filed: Dec. 16, 2013

(65) Prior Publication Data

US 2015/0102636 A1   Apr. 16, 2015

(30) Foreign Application Priority Data

Oct. 10, 2013   (KR) .................. 10-2013-0120740

(51) Int. Cl.
*B62D 25/08*   (2006.01)

(52) U.S. Cl.
CPC ..................................... *B62D 25/08* (2013.01)

(58) Field of Classification Search
CPC ....................................................... B62D 25/08
USPC .................. 296/187.01, 187.03, 187.09, 192, 296/193.09, 203.02, 203.03, 204, 29; 293/132
See application file for complete search history.

(56) References Cited

U.S. PATENT DOCUMENTS

| | | | | | |
|---|---|---|---|---|---|
| 4,267,895 | A | * | 5/1981 | Eggert, Jr. ................... | 180/68.1 |
| 4,501,129 | A | * | 2/1985 | Charles .......................... | 62/239 |
| 4,542,934 | A | * | 9/1985 | Komatsu et al. ......... | 296/203.02 |
| 4,560,198 | A | * | 12/1985 | Katano et al. ............ | 296/203.02 |
| 4,909,565 | A | * | 3/1990 | Harasaki et al. ......... | 296/187.09 |
| 4,919,474 | A | * | 4/1990 | Adachi et al. ............ | 296/203.02 |
| 8,419,116 | B2 | * | 4/2013 | Boettcher et al. ........ | 296/203.02 |
| 2013/0146376 | A1 | * | 6/2013 | Nam et al. .................... | 180/68.1 |
| 2013/0161978 | A1 | * | 6/2013 | Herntier et al. .......... | 296/193.09 |
| 2013/0249243 | A1 | * | 9/2013 | Lee et al. .................. | 296/187.03 |

FOREIGN PATENT DOCUMENTS

| | | |
|---|---|---|
| JP | 2010-83393 A | 4/2010 |
| JP | 2013-49348 A | 3/2013 |
| KR | 10-2012-0043554 A | 5/2012 |

* cited by examiner

*Primary Examiner* — Pinel Romain
(74) *Attorney, Agent, or Firm* — Morgan, Lewis & Bockius LLP (57) ABSTRACT

A reinforcement unit for an engine-room encapsulation mounted to secure rigidity of a vehicle body, may include a cross member disposed to cross the vehicle body in a traverse direction of a vehicle and coupled with a cowl of the vehicle body, a pair of connection members, of which each first end is connected to a first end of the cross member and a second end thereof, respectively and, of which each second end is connected to two shock absorber housings disposed at both sides of the vehicle body, and a pair of support members, of which each first end is connected to second ends of the pair of connection members and, of which each second end is connected to a front end module of the vehicle body, wherein the reinforcement unit for the engine-room encapsulation is coupled with an engine-room encapsulation structure.

6 Claims, 5 Drawing Sheets

REINFORCEMENT UNIT FOR ENGINE-ROOM ENCAPSULATION

CROSS-REFERENCE TO RELATED APPLICATION

The present application claims priority to Korean Patent Application No. 10-2013-0120740 filed on Oct. 10, 2013, the entire contents of which is incorporated herein for all purposes by this reference.

BACKGROUND OF THE INVENTION

1. Field of the Invention

The present invention relates to a reinforcement unit for engine-room encapsulation, and more particularly, to a reinforcement unit for engine-room encapsulation capable of increasing rigidity of a vehicle body and an engine-room encapsulation structure against shock at the time of a head-on collision of a vehicle.

2. Description of Related Art

Generally, an engine room means a space in which an engine is mounted. If a temperature of the engine room is not preserved, fuel consumption may be increased at the time of initial starting of the engine.

Therefore, researches into an engine-room thermostat, which preserves the temperature of the engine room by suppressing heat generated from the engine from being released to the outside and minimizes the fuel consumption at the time of the initial starting of the engine, have been actively conducted recently.

However, when the engine-room thermostat is further mounted in the engine room, a weight and production cost of a vehicle body may be increased due to components configuring the engine-room thermostat. Further, when the engine-room thermostat is not firmly connected to the vehicle body, the rigidity of the engine-room thermostat is weakened and the rigidity of the vehicle body deteriorates, thereby having an adverse effect on stability of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a reinforcement unit for engine-room encapsulation to allow an engine-room encapsulation structure to be easily connected to a vehicle body.

Further, various aspects of the present invention are directed to providing a reinforcement unit for engine-room encapsulation to secure rigidity of a vehicle body and an engine-room encapsulation structure at the time of a head-on collision of a vehicle.

In addition, various aspects of the present invention are directed to providing a reinforcement unit for engine-room encapsulation to improve noise vibration harshness (NVH) performance of a vehicle.

In an aspect of the present invention, reinforcement unit for an engine-room encapsulation mounted to secure rigidity of a vehicle body, may include a cross member disposed to cross the vehicle body in a traverse direction of a vehicle and coupled with a cowl of the vehicle body, a pair of connection members, of which each first end is connected to a first end of the cross member and a second end thereof, respectively and, of which each second end is connected to two shock absorber housings disposed at both sides of the vehicle body, and a pair of support members, of which each first end is connected to second ends of the pair of connection members and, of which each second end is connected to a front end module of the vehicle body, wherein the reinforcement unit for the engine-room encapsulation is coupled with an engine-room encapsulation structure.

The reinforcement unit for the engine-room encapsulation may include at least a pair of horizontal extending members which protrudes toward a side of the vehicle body from each of the support members and is each connected to fender apron upper members disposed at both sides of the vehicle body.

The reinforcement unit for the engine-room encapsulation may include at least a pair of vertical extending members which protrudes toward a lower portion of the vehicle body from each of the support members and is each connected to front side members disposed at both sides of the vehicle body.

A closed portion is formed by being enclosed with the cross member, the connection members, the support members, and the front end module of the vehicle body.

The cross member, the connection members, and the support members are coupled with the engine-room encapsulation structure by bolting.

A closed portion enclosed with any one of the pair of support members, any one of the pair of horizontal extending members, and the front end module is formed.

The reinforcement unit for the engine-room encapsulation may further include at least a pair of vertical extending members which protrudes toward a lower portion of the vehicle body from each of the support members and is each connected to front side members disposed at both sides of the vehicle body, wherein any one of the horizontal extending members and any one of the vertical extending members are disposed to meet each other at one point.

In another aspect of the present invention, a reinforcement unit for an engine-room encapsulation to increase rigidity of an engine-room encapsulation structure including an upper surface, a lower surface, a side surface, and a back surface so as to enclose an upper portion, a lower portion, a side portion, and a back portion of an engine room and a vehicle body, may include a cross member disposed to cross the vehicle body in a traverse direction of a vehicle and coupled with the back surface of the engine-room encapsulation structure, a pair of connection members which extends toward a front of the vehicle body from a first end and a second end of the cross member, respectively and is coupled with the side surface of the engine-room encapsulation structure, and a pair of support members which further extends toward a front of the vehicle body from each of the pair of connection members extending from the cross member and is coupled with the side surface of the engine-room encapsulation structure, wherein the support members, the connection members, and the cross member are each coupled with any one member of the vehicle body so that a load transferred from the front of the vehicle body is transferred to a back of the vehicle body through the support members, the connection members, and the cross member in order.

The reinforcement unit for the engine-room encapsulation may further include at least a pair of horizontal extending members which protrudes toward a side of the vehicle body from each of the pair of support members and is each connected to any one member of the vehicle body at both sides of the vehicle body.

The reinforcement unit for the engine-room encapsulation may may further include at least a pair of vertical extending members which protrudes toward a lower portion of the vehicle body from each of the pair of support members and is each connected to any one of the vehicle body at both sides of the vehicle body.

A closed portion enclosed with the cross member, the connection members, the support members, and any one member of the vehicle body is formed.

A closed portion enclosed with any one of the pair of support members, any one of the pair of horizontal extending members, and any one member of the vehicle body is formed.

The reinforcement unit for the engine-room encapsulation may may further include at least a pair of vertical extending members which protrudes toward a lower portion of the vehicle body from each of the pair of support members and is each connected to any one member of the vehicle body at both sides of the vehicle body, wherein the horizontal extending member and the vertical extending member disposed at the same side among both sides of the vehicle body are disposed to meet each other at one point of the support member disposed at the same side.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
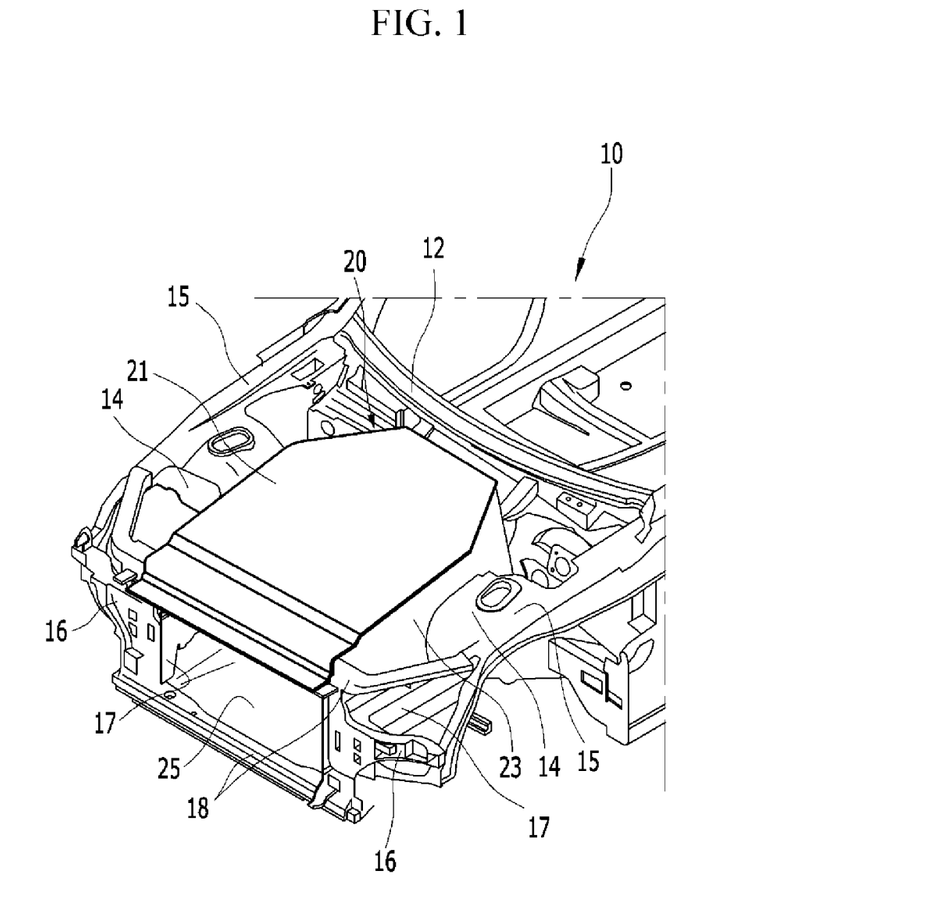
FIG. 1 is a schematic diagram of an engine-room encapsulation structure according to an exemplary embodiment of the present invention.

FIG. 1 is a configuration diagram of an engine-room encapsulation structure according to an exemplary embodiment of the present invention.

As illustrated in FIG. 1, an engine-room encapsulation structure 20 according to an exemplary embodiment of the present invention is mounted in a vehicle body 10 to enclose an engine room.

First, the vehicle body 10 includes a cowl 12, a fender apron upper member 15, a fender apron reinforce member 16, a front end module 18, a front side member 17, and a shock absorber housing 14.

The cowl 12 is a panel which is connected in front of a front glass of a vehicle. Further, the cowl 12 may extend from a dashboard or may be mounted on the dashboard.

Figure 4:
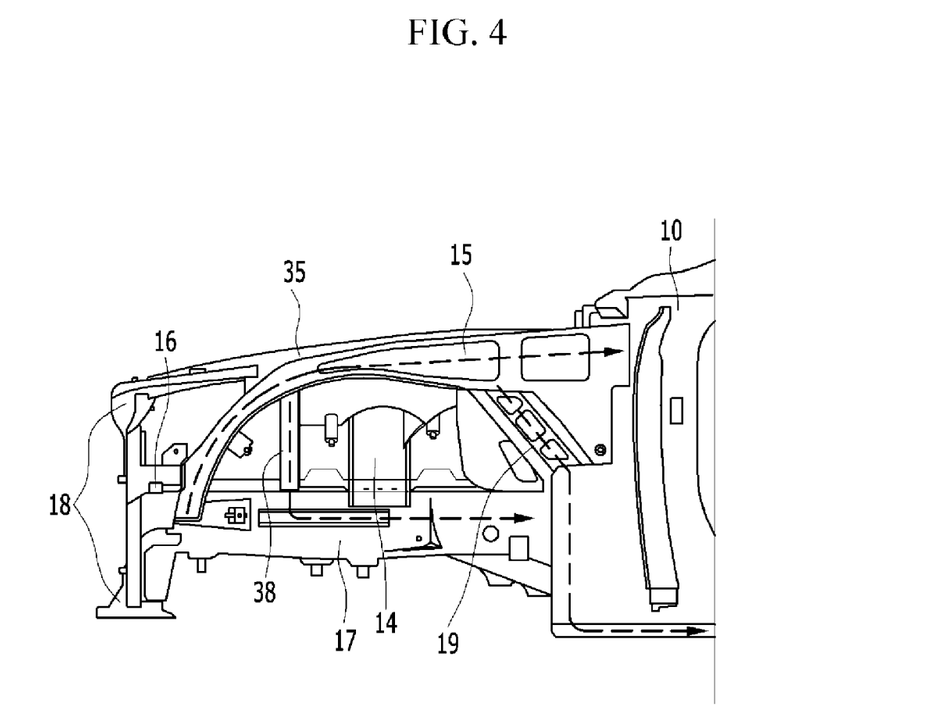
FIG. 4 is a side view of the reinforcement unit for engine-room encapsulation according to the exemplary embodiment of the present invention.

The fender apron upper member 15 is an upper member of a fender apron 19 (see FIG. 4). That is, the fender apron upper member 15 is mounted at the upper portion of the fender apron 19 which serves as a compartment between a wheel and the engine room inside the fender which is a mudguard.

The fender apron reinforce member 16 connects the fender apron 19 to other members of the vehicle body 10 to reinforce rigidity of the fender apron 19. Meanwhile, FIG. 1 illustrates the fender apron reinforce member 16 which connects the fender apron upper member 15 to the front end module 18.

The front side member 17 is mounted at a front floor and a lower portion of the dashboard by setting a longitudinal direction of the vehicle body 10 as a length direction thereof and is a beam which forms a frame of a front body.

The shock absorber housing 14 is a part at which the shock absorber is mounted and is disposed between the fender apron upper member 15 and the front side member 17.

The front end module 18 is a member which configures several parts on a front surface of the vehicle body 10 as a single module. That is, the front end module 18 is disposed at a front line of the front body.

Members of the vehicle body 10 configuring the front body are obvious to a person having ordinary skill in the art to which the present invention pertains (hereinafter, a person of ordinary skill in the art) and the detailed description thereof will be omitted.

The engine-room encapsulation structure 20 according to the exemplary embodiment of the present invention includes a side shield unit 23, an upper shield unit 21, and a lower shield unit 25.

The side shield unit 23 shields a side and a back of the engine room and is connected to the vehicle body 10. Further, a front portion, an upper portion, and a lower portion of the side shield unit 23 are opened. Herein, directions represented by top, bottom, front, and back are based on top, bottom, front, and back directions of the vehicle body.

The upper shield unit 21 is disposed at an opened upper portion of the side shield unit 23 to cover the side shield unit 23. That is, the upper shield unit 21 shields an upper portion of the engine room.

Further, one end of the upper shield unit 21 is mounted on the front end module 18 and one end of the side shield unit 23 is mounted on the front side member 17.

The lower shield unit 25 is disposed to shield a lower portion of the engine room. Further, the lower shield unit 25 is mounted on an under guard. Herein, the under guard is a plate to protect a driving apparatus at a lower portion and a bottom of the engine. One end of a front of the under guard is connected to the front end module 18 and passes through a front wheel of the vehicle and then extends to a back thereof. Further, the lower shield unit 25 may have a wide plate shape which extends along a length direction of the under guard. Therefore, the lower shield unit 25 may cover various apparatuses at the lower portion of the engine and a lower portion of the vehicle.

Figure 2:
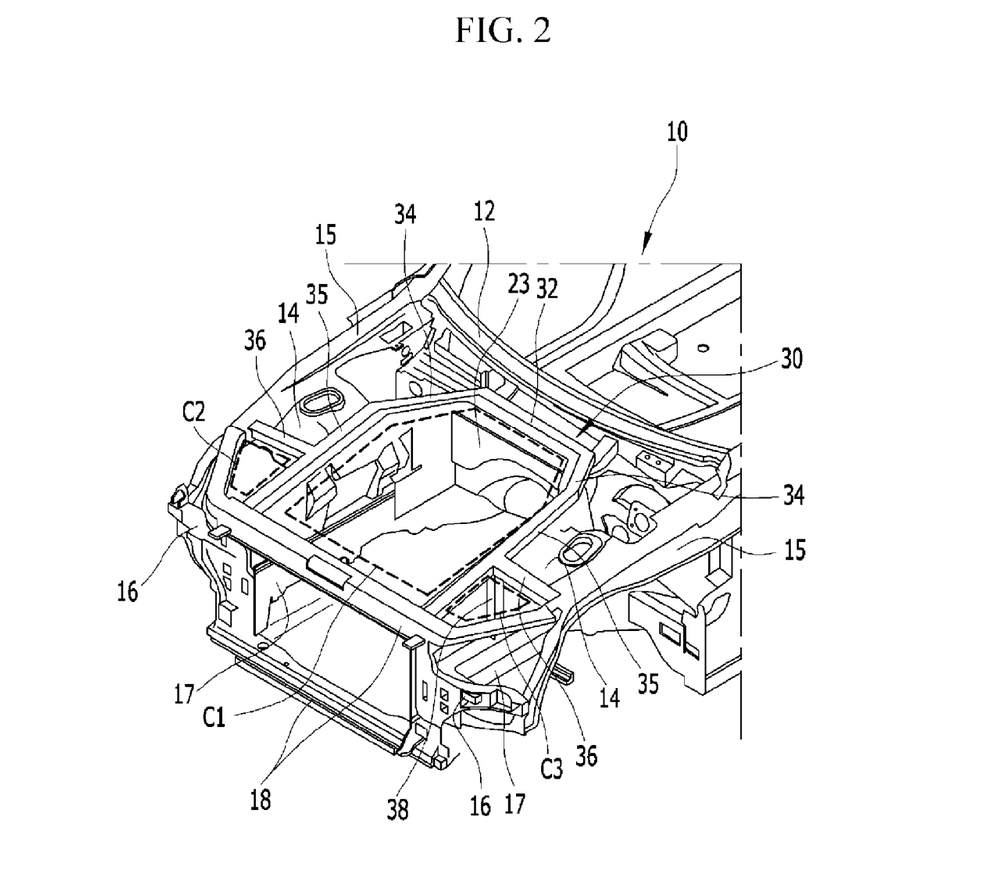
FIG. 2 is a configuration diagram of a reinforcement unit for engine-room encapsulation according to the exemplary embodiment of the present invention.

FIG. 2 is a configuration diagram of the reinforcement unit for engine-room encapsulation according to the exemplary embodiment of the present invention.

As illustrated in FIG. 2, a reinforcement unit 30 for engine-room encapsulation according to an exemplary embodiment of the present invention includes a cross member 32, a connection member 34, a support member 35, a horizontal extending member 36, and a vertical extending member 38.

The cross member 32, the connection member 34, the support member 35, the horizontal extending member 36, and the vertical extending member 38 may have a bar shape which elongates in one direction.

The cross member 32 is disposed to laterally cross the vehicle body 10. Further, the cross member 32 is adjacently disposed at the cowl 12. Further, the cross member 32 has the same length direction as the cowl 12 which is disposed to laterally cross the vehicle body 10 and is coupled with the cowl 12.

The connection member 34 is disposed in pair.

One of the pair of connection members 34 connects one end of the cross member 32 to one of the shock absorber housings 14 disposed at both surfaces of the vehicle body 10. Further, one end of the one connection member 34 is connected to the cowl 12 of the vehicle body 10 and the other end thereof is connected to the one shock absorber housing 14. That is, one end of the cross member 32 is connected to one end of the one connection member 34 and a portion at which the one end of the cross member 32 meets the one end of the one connection member 34 is coupled with the cowl 12.

The other of the pair of connection members 34 connects the other end of the cross member 32 to the other of the shock absorber housings 14. Further, one end of the other connection member 34 is connected to the cowl 12 of the vehicle body 10 and the other end thereof is connected to the other shock absorber housing 14. That is, the other end of the cross member 32 is connected to the one end of the other connection member 34 and a portion at which the other end of the cross member 32 meets the one end of the other connection member 34 is coupled with the cowl 12.

Meanwhile, a coupling among the connection member 34 and the cowl 12 and the shock absorber housing 14 may be made by welding.

The support member 35 is disposed in pair. Further, the pair of support members 35 each connects each of the other ends of the pair of connection members 34 and an upper portion of the front end module 18 of the vehicle 10. That is, one end of the support member 35 is connected to the shock absorber housing 14, simultaneously with being connected to the other end of the connection member 34 and the other end of the support member 35 is connected to the front end module 18.

Meanwhile, the coupling among the support member 35 and the shock absorber housing 14 and the front end module 18 may be made by the welding.

The horizontal extending member 36 is disposed in pair. The pair of horizontal extending members 36 each protrudes toward a side of the vehicle body 10 from one support member 35 and the other support member 35. Further, the horizontal extending member 36 is horizontally disposed or substantially horizontally disposed with respect to a ground. Further, the protruding horizontal extending member 36 extends to the fender apron upper member 15. That is, the horizontal extending member 36 connects the support member 35 to the fender apron upper member 15.

Meanwhile, the coupling between the horizontal extending member 36 and the fender apron upper member 15 may be made by the welding.

The horizontal extending member 38 is disposed in pair. The pair of vertical extending members 38 each protrudes toward a lower portion of the vehicle body 10 from the one support member 35 and the other support member 35. Further, the vertical extending member 38 is vertically disposed or substantially vertically disposed with respect to the ground. Further, the protruding vertical extending member 38 extends to the front side member 17. That is, the vertical extending member 38 connects the support member 35 to the front side member 17.

Meanwhile, the coupling between the vertical extending member 38 and the front side member 17 may be made by the welding.

The reinforcement unit 30 for engine-room encapsulation according to the exemplary embodiment of the present invention is coupled with the side shield unit 23 of the engine-room encapsulation structure 20.

A structure in which lower ends of a side surface and a back surface of the side shield unit 23 are connected to the vehicle body 10 is obvious to those skilled in the art, and therefore the detailed description thereof will be omitted. Meanwhile, an upper end of the side shield unit 23 is connected to the vehicle body 10 by the reinforcement unit 30. Herein, directions represented by top, bottom, front, and back are based on the top, bottom, front, and back directions of the vehicle body 10.

The upper end of the side shield unit 23 may have a shape corresponding to the reinforcement unit 30 so as to be coupled with the reinforcement unit 30. That is, the upper end of the side shield unit 23 has a shape corresponding to the shape formed by connecting the cross member 32, the connection member 34, and the support member 35. Further, the upper end of the side shield unit 23 contacts the cross member 32, the connection member 34, and the support member 35. Further, the upper end of the side shield unit 23 may be coupled with the reinforcement unit 30 by bolting in the state in which the upper end of the side shield unit 23 contacts the cross member 32, the connection member 34, and the support member 35.

Herein, the cross member 32, the connection member 34, the support member 35, the horizontal extending member 36, and the vertical extending member 38 may be molded integrally. Further, the reinforcement unit 30 for engine-room encapsulation integrally molded forms first, second, and third closed portions C1, C2, and C3, along with the vehicle body 10.

The first closed portion C1 is formed by being enclosed with the cross member 32, the connection member 34, the support member 35, and the front end module 18

The second closed portion C2 is formed by being enclosed with the one support member 35, the one horizontal extending member 36, and the upper portion of the front end module 18 or the fender apron upper member 15.

The third closed portion C3 is formed by being enclosed with the other support member 35, the other horizontal extending member 36, and the upper portion of the front end module 18 or the fender apron upper member 15.

As these closed portions C1, C2, and C3 are formed, a load transferred to the vehicle body 10 may be effectively dispersed through the reinforcement unit 30 and the vehicle body 10. Further, a torsion of the vehicle body 10 may be suppressed.

Figure 3:
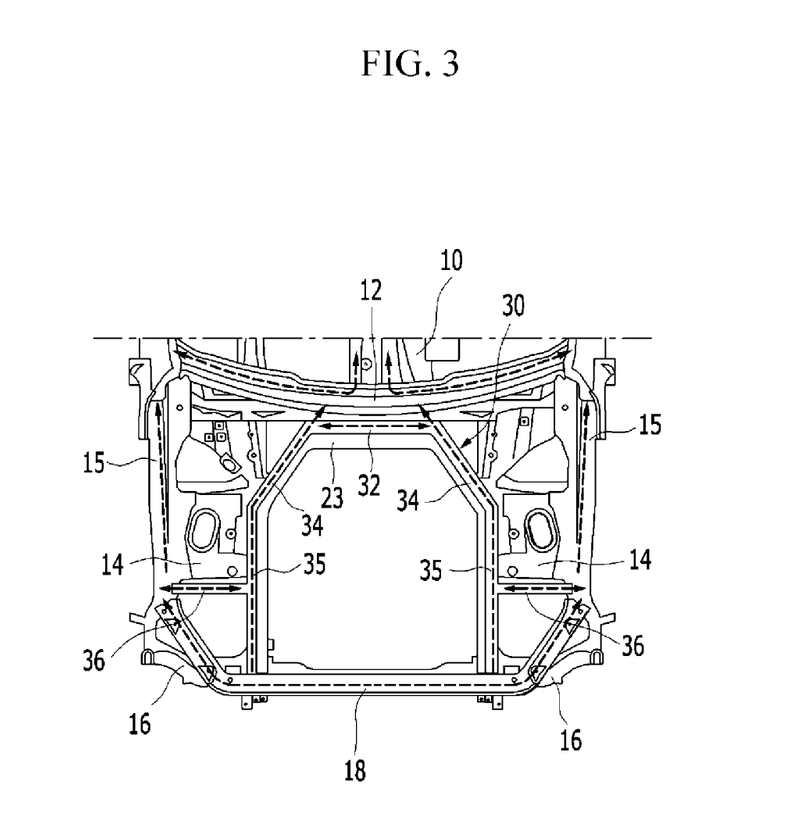
FIG. 3 is a plan view of the reinforcement unit for engine-room encapsulation according to the exemplary embodiment of the present invention.

FIG. 3 is a plan view of the reinforcement unit for engine-room encapsulation according to the exemplary embodiment of the present invention. Further, FIG. 3 illustrates a transfer path of the load transferred through the front of the vehicle body 10 by an arrow. That is, the transfer path of the load illustrated in FIG. 3 may be a path through which the load is transferred at the time of a head-on collision of a vehicle.

As illustrated in FIG. 3, a portion of the load transferred through a front of the vehicle body 10 is transferred to a back of the vehicle body 10 via the front end module 18 and the fender apron upper member 15. Further, another portion of the load transferred through the front of the vehicle body 10 is transferred to the back of the vehicle body 10 via the front end module 18, the support member 35, and the connection member 34 in order.

In this case, the horizontal extending member 36 becomes the transfer path of the load between the fender apron upper member 15 and the support member 35, such that the load transferred through the front of the vehicle body 10 may be equally distributed and transferred to the fender apron upper member 15 and the support member 35. Further, the cross member 32 becomes the transfer path of the load between the pair of connection members 34, such that the excessive transfer of the load to any one of the pair of connection members 24 may be prevented. Further, the cowl 12 receives the load transferred via the fender apron upper member 15 and the load transferred via the connection member 34 and thus disperses the load to a center and a side of the vehicle body 10.

FIG. 4 is a side view of the reinforcement unit for engine-room encapsulation according to the exemplary embodiment of the present invention. Further, FIG. 4 illustrates the transfer path of the load transferred through the front of the vehicle body 10 by an arrow. That is, the transfer path of the load illustrated in FIG. 4 may be the path through which the load is transferred at the time of the head-on collision of a vehicle.

As illustrated in FIG. 4, a part of the load transferred through the front end module 18 is transferred to the back of the vehicle body 10 via the fender apron upper member 15. As illustrated in FIG. 3, another part of the load transferred through the front end module 18 is transferred to the back of the vehicle body 10 via the support member 35.

In this case, the vertical extending member 38 becomes the transfer path of the load between the support member 35 and the front side member 17, such that the load transferred to the support member 35 may be dispersed to the front side member 17 and transferred to the back of the vehicle body 10. Further, the load transferred to the fender apron upper member 15 may be dispersed to the front side member 17 via the horizontal extending member 36 and the vertical extending member 38 and transferred to the back of the vehicle body 10. Herein, the horizontal extending member 36 and the vertical extending member 38 may be disposed to meet each other at one point of the support member 35 so that the load may be transferred via the horizontal extending member 36 and the vertical extending member 38. Further, the load transferred to the fender apron upper member 15 may be dispersed to the lower portion of the vehicle body 10 through the fender apron 19.

Figure 5:
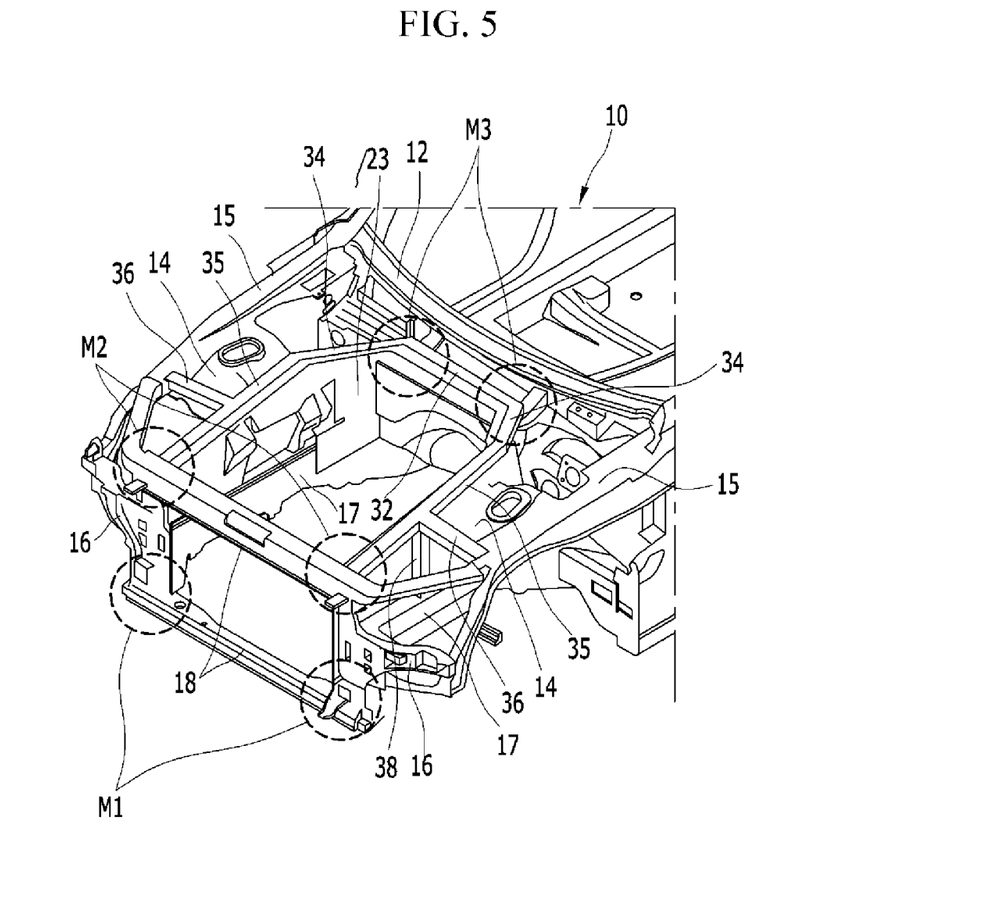
FIG. 5 is a diagram illustrating a connection part to transfer a load through the reinforcement unit for engine-room encapsulation according to the exemplary embodiment of the present invention and a vehicle body.

FIG. 5 is a diagram illustrating a connection part to transfer a load through the reinforcement unit for engine-room encapsulation according to the exemplary embodiment of the present invention and a vehicle body.

FIG. 5 illustrates first, second, and third connection parts M1, M2, and M3 to which one member of the vehicle body 10 and another member thereof are connected or the member of the vehicle body 10 and the member of the reinforcement unit 30 are connected.

The first connection part M1 is a part to which the lower portion of the front end module 18 and the front side member 17 are connected, the second connection part M2 is a part to which the upper portion of the front end module 18 and the support member 35 are connected, and the third connection part M3 is a part to which the connection member 34, the cross member 32, and the cowl 12 are connected.

The load transferred through the front of the vehicle body 10 may be easily dispersed by the first, second, and third connection parts M1, M2, and M3 and at the same time, the vibration transferred from a road surface may be minimized. Therefore, noise due to vibration is reduced and ride comfort is improved.

As described above, according to the exemplary embodiment of the present invention, the engine-room encapsulation structure 20 is connected to the vehicle body 10 to effectively disperse the load generated by the head-on collision of the vehicle, thereby improving the rigidity of the engine-room encapsulation structure 20 and the vehicle body 10. Further, the vibration transferred from the road surface during the driving is minimized, thereby improving the NVH performance of the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A reinforcement unit for an engine-room encapsulation to increase rigidity of an engine-room encapsulation structure including an upper surface, a lower surface, a side surface, and a back surface so as to enclose an upper portion, a lower portion, a side portion, and a back portion of an engine room and a vehicle body, comprising:
　　a cross member disposed to cross the vehicle body in a traverse direction of a vehicle and coupled with the back surface of the engine-room encapsulation structure;
　　a pair of connection members which extends toward a front of the vehicle body from a first end and a second end of the cross member, respectively and is coupled with the side surface of the engine-room encapsulation structure; and
　　a pair of support members which further extends toward the front of the vehicle body from each of the pair of connection members extending from the cross member and is coupled with the side surface of the engine-room encapsulation structure;
　　wherein the support members, the connection members, and the cross member are each coupled with any one member of the vehicle body so that a load transferred from the front of the vehicle body is transferred to a back of the vehicle body through the support members, the connection members, and the cross member in order.

2. The reinforcement unit for the engine-room encapsulation of claim 1, further comprising:
   at least a pair of horizontal extending members which protrudes toward a side of the vehicle body from each of the pair of support members and is each connected to any one member of the vehicle body at both sides of the vehicle body.

3. The reinforcement unit for the engine-room encapsulation of claim 1, further comprising:
   at least a pair of vertical extending members which protrudes toward the lower portion of the vehicle body from each of the pair of support members and is each connected to any one of the vehicle body at both sides of the vehicle body.

4. The reinforcement unit for the engine-room encapsulation of claim 1, wherein a closed portion enclosed with the cross member, the connection members, the support members, and any one member of the vehicle body is formed.

5. The reinforcement unit for the engine-room encapsulation of claim 2, wherein a closed portion enclosed with any one of the pair of support members, any one of the pair of horizontal extending members, and any one member of the vehicle body is formed.

6. The reinforcement unit for the engine-room encapsulation of claim 2, further comprising:
   at least a pair of vertical extending members which protrudes toward the lower portion of the vehicle body from each of the pair of support members and is each connected to any one member of the vehicle body at both sides of the vehicle body,
   wherein the horizontal extending member and the vertical extending member disposed at a same side among both sides of the vehicle body are disposed to meet each other at one point of the support member disposed at the same side.

* * * * *